April 26, 1932.  J. L. BROWNELL  1,855,219
ADJUSTABLE SEAT
Filed May 31, 1930  2 Sheets-Sheet 1
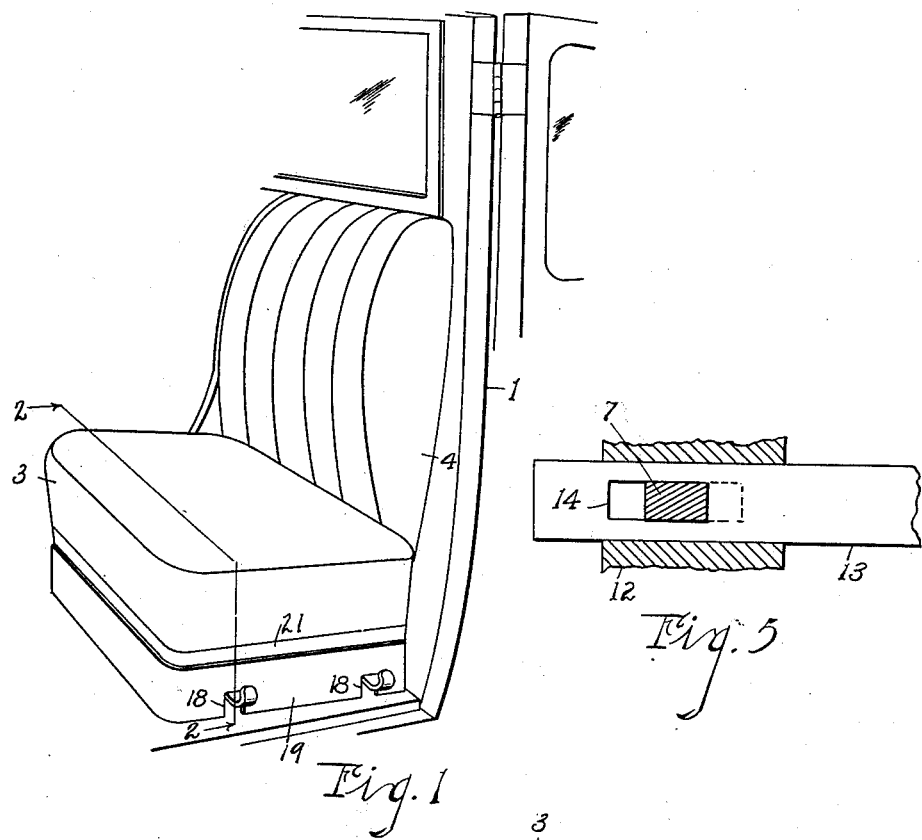
Fig. 1
Fig. 5
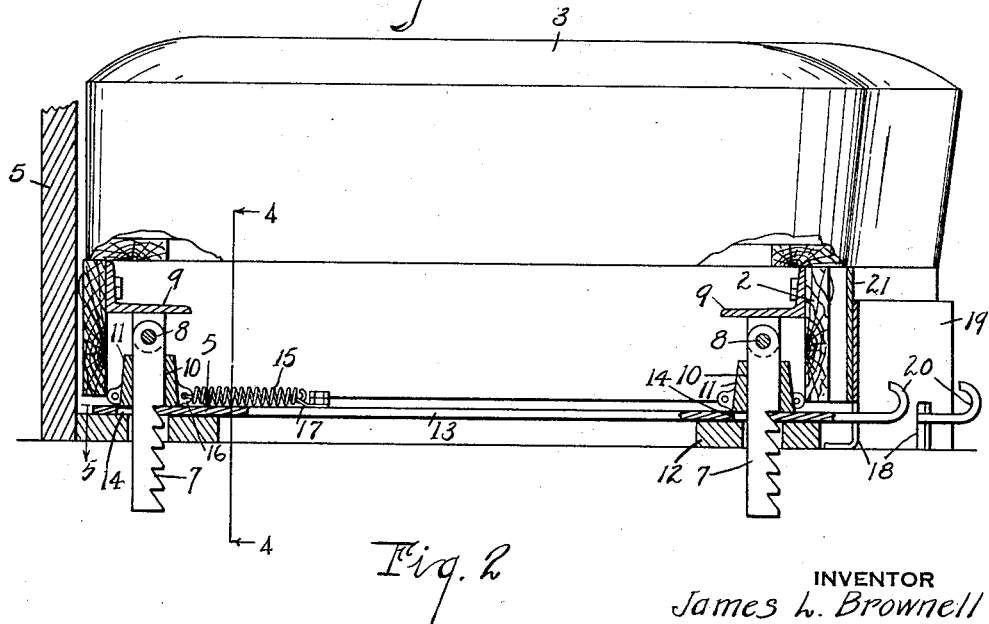
Fig. 2
INVENTOR
James L. Brownell
BY
Chappell Earl
ATTORNEYS April 26, 1932.  J. L. BROWNELL  1,855,219
ADJUSTABLE SEAT
Filed May 31, 1930  2 Sheets-Sheet 2
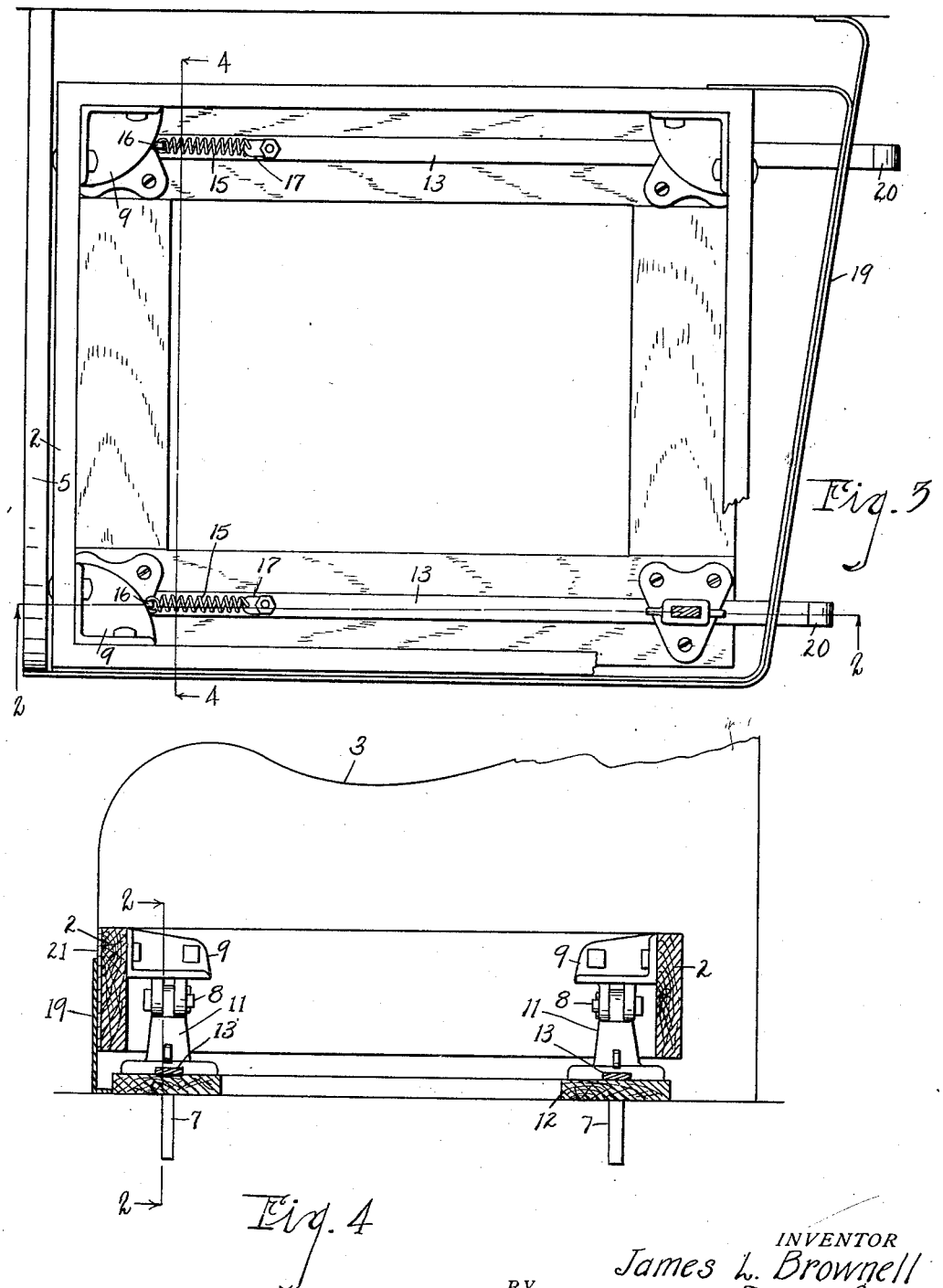
INVENTOR
James L. Brownell
BY
Chappell Earl
ATTORNEYS Patented Apr. 26, 1932

1,855,219

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN

ADJUSTABLE SEAT

Application filed May 31, 1930. Serial No. 458,666.

The main object of this invention is to provide an adjustable seat which is well adapted for motor vehicles and by means of which the height of the seat may be quickly adjusted, and also one which provides for tilting adjustment of the seat.

A further object is to provide a structure having these advantages which is economical in its parts, compact, and strong and rigid.

Objects pertaining to details and economies of my invention will definitely appear from the description to follow. The invention is defined in the claim.

A structure embodying the features of my invention is clearly illustrated in the accompanying drawings, in which:

Fig. 1 is a fragmentary perspective view of a motor vehicle of the taxicab type illustrating my invention as embodied in the driver's seat thereof.

Fig. 2 is a fragmentary view partially in vertical section on line 2—2 of Figs. 1, 3 and 4.

Fig. 3 is a fragmentary view with the seat cushion removed.

Fig. 4 is a fragmentary view in section on line 4—4 of Figs. 2 and 3.

Fig. 5 is an enlarged detail on line 5—5 of Fig. 2.

Referring to the drawings, 1 represents the body of a motor vehicle of the taxicab type. The driver's seat 2 is frame-like in structure adapted to support the cushion 3. The back 4 is mounted in coacting relation to the seat. At the inner side of the driver's seat is a partition wall 5.

The seat base or frame 2 is adapted to receive the cushion 3 and is adjustably supported by the toothed standards 7 which are pivoted at 8 to brackets 9 mounted at the corners of the seat frame 2. These standards 7 are arranged in pairs and are slidable in the vertical slots 10 of the base members 11 mounted on the frame-like base 12 and forming in effect a part of the base.

The detent slides or bars 13 are slidably mounted in the base members and are slotted at 14 to receive the standards. The coiled springs 15 are connected to ears 16 on the base members and to the clips or connectors 17 on the bars so that the springs act to urge the detents into engagement with the teeth.

Owing to the pivotal connection of the standards to the seat, the seat may be tilted and there is sufficient play in the pivots so that the seat may be tilted from front to rear as desired. The detents are arranged through slots 18 in the housing 19 and are provided with finger-pieces 20 at their outer ends. A skirt 21 is secured to the seat to telescope with this housing.

I have illustrated and described my improvements as I have embodied the same in the driver's seat of a motor vehicle of the taxicab type. I have not attempted to describe other embodiments or adaptations as it is believed this disclosure will enable those skilled in the art to embody or adapt my improvements as may be desired.

Having thus described my invention what I claim as new and desire to secure by Letters Patent is:

A tiltable and vertically adjustable seat provided with base members having vertical standard slots and transverse detent slide slots therein, pairs of front and rear toothed standards pivotally connected to said seat and slidably disposed in said standard slots, the teeth of said standards facing toward one side of the seat, detent slides slidably disposed in said detent slide slots and having handles accessible at said one side of the seat, said slides having slots through which said standards pass, and tension springs connected to said slides and the base members at the other side of the seat for resiliently urging the detent slides into engagement with the teeth of the standards.

In witness whereof I have hereunto set my hand.

JAMES L. BROWNELL.